United States Patent
Lee et al.

(10) Patent No.: US 12,277,440 B2
(45) Date of Patent: Apr. 15, 2025

(54) SCHEDULER, METHOD OF OPERATING THE SAME, AND ACCELERATOR APPARATUS INCLUDING THE SAME

(71) Applicants: Samsung Electronics Co., Ltd., Suwon-si (KR); Seoul National University R&DB Foundation, Seoul (KR)

(72) Inventors: Seung Wook Lee, Suwon-si (KR); Jae Wook Lee, Seoul (KR); Young Hwan Oh, Seoul (KR); Seng Hak Kim, Seoul (KR); Tae Jun Ham, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 227 days.

(21) Appl. No.: 17/170,109

(22) Filed: Feb. 8, 2021

(65) Prior Publication Data

US 2021/0373944 A1 Dec. 2, 2021

(30) Foreign Application Priority Data

Jun. 1, 2020 (KR) .......................... 10-2020-0065626

(51) Int. Cl.
*G06F 9/46* (2006.01)
*G06F 9/48* (2006.01)
*G06F 9/50* (2006.01)

(52) U.S. Cl.
CPC .......... *G06F 9/4881* (2013.01); *G06F 9/5016* (2013.01)

(58) Field of Classification Search
CPC .............................. G06F 9/4881; G06F 9/5016
See application file for complete search history.

(56) References Cited

U.S. PATENT DOCUMENTS

| | | |
|---|---|---|
| 2017/0103298 A1 | 4/2017 | Ling et al. |
| 2019/0138903 A1 | 5/2019 | Bose et al. |
| 2019/0187963 A1* | 6/2019 | Bokhari .................... G06F 8/35 |
| 2019/0236450 A1 | 8/2019 | Li et al. |

(Continued)

FOREIGN PATENT DOCUMENTS

| | | |
|---|---|---|
| CN | 103049245 A | 4/2013 |
| CN | 110165714 A | 8/2019 |

(Continued)

OTHER PUBLICATIONS

Zhang et al., Cambricon-X: An accelerator for Sparse neural networks, IEEE, 12 pages. (Year: 2016).*

(Continued)

*Primary Examiner* — Diem K Cao
(74) *Attorney, Agent, or Firm* — NSIP Law

(57) ABSTRACT

A scheduler, a method of operating the scheduler, and an accelerator apparatus including the scheduler are disclosed. A method of operating a scheduler to perform scheduling on models to be executed in an accelerator, the method includes receiving at least one execution request for a first model and a second model that are executed independently from each other in the accelerator, and performing layer-unit scheduling on the first model and the second model based on workload characteristics of the first model and the second model.

20 Claims, 9 Drawing Sheets

(56) References Cited

U.S. PATENT DOCUMENTS

2019/0266015 A1 8/2019 Chandra et al.
2019/0324809 A1* 10/2019 Zhao ..................... G06F 9/505

FOREIGN PATENT DOCUMENTS

| KR | 10-1793011 B1 | 11/2017 | | |
|---|---|---|---|---|
| KR | 10-2019-0022627 A | 3/2019 | | |
| KR | 102029711 B1 | * | 10/2019 | ........... G06F 9/5027 |

OTHER PUBLICATIONS

Guan et al., FP-DNN: An Automated Framework for Mapping Deep Neural Networks onto FPGAs with RTL-HLS Hybrid Templates, IEEE, pp. 152-159. (Year: 2017).*
Shea et al., Heterogeneous Scheduling of Deep Neural Networks for Low-power Real-time Design, ACM, vol. 15, No. 4, 31 pages. (Year: 2019).*
Chen et al., Partition and Scheduling Algorithms for Neural network Accelerators, Springer Nature, APPT 2019, LNCS 11719, pp. 55-67. (Year: 2019).*
Zhang et al., Caffeine: Toward Uniformed Representation and Acceleration for Deep Convolutional Neural Networks, IEEE, vol. 38, No. 11, Nov. 2019, 14 pages. (Year: 2019).*
Zhang et al., Optimizing FPGA-based Accelerator Design for Deep Convolutional Neural Networks, ACM, 2015, 10 pages. (Year: 2015).*
Shen et al., Maximizing CNN Accelerator Efficiency Through Resource Partitioning, 2017, ACM, 13 pages. (Year: 2017).*
Baek, Eunjin, et al., "A Multi-Neural Network Acceleration Architecture," 2020 *ACM/IEEE 47th Annual International Symposium on Computer Architecture (ISCA). IEEE*, 2020 (pp. 1-14).
Extended European Search Report issued on Nov. 2, 2021 in counterpart European Patent application No. 21175973.3 (10 pages in English).

* cited by examiner

SCHEDULER, METHOD OF OPERATING THE SAME, AND ACCELERATOR APPARATUS INCLUDING THE SAME

CROSS-REFERENCE TO RELATED APPLICATIONS

This application claims the benefit under 35 USC § 119(a) of Korean Patent Application No. 10-2020-0065626 filed on Jun. 1, 2020, in the Korean Intellectual Property Office, the entire disclosures of which are incorporated herein by reference for all purposes.

BACKGROUND

Field

The following description relates to a scheduler, a method of operating the scheduler, and an accelerator apparatus including the scheduler.

Description of Related Art

As artificial intelligence (AI) technology develops, a need for independent hardware solely for AI is increasing, which performs inference and learning. Thus, various devices are being developed as hardware dedicated to the implementation of AI.

Such dedicated hardware for AI may be embodied by, for example, a central processing unit (CPU), a graphics processing unit (GPU), a field-programmable gate array (FPGA), and an application-specific integrated circuit (ASIC) that may be repurposed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of scheduling an accelerator, the method including receiving at least one execution request for a first model and a second model that are executed independently from each other in the accelerator, and performing layer-unit scheduling on the first model and the second model based on workload characteristics of the first model and the second model.

The performing of the layer-unit scheduling may include performing the layer-unit scheduling on the first model and the second model, independently from an order in which the at least one execution request is received.

One of the first model and the second model may have a workload characteristic with a computation cost greater than a memory access cost, and the other one of the first model and the second model may have a workload characteristic with a memory access cost greater than a computation cost.

The performing of the layer-unit scheduling may include performing the layer-unit scheduling such that layers included in the first model and layers included in the second model are processed with a time interval therebetween, in response to the first model and the second model having a same workload characteristic.

The performing of the layer-unit scheduling may include assigning two layers having different workload characteristics among layers in each of the first model and the second model to a computation resource and a memory access resource of the accelerator, respectively.

The performing of the layer-unit scheduling may include assigning, to a memory access resource of the accelerator, a second layer subsequent to a first layer in the first model or a third layer to be subsequently processed in the second model, in response to the first layer of the first model being assigned to a computation resource of the accelerator.

The first layer assigned to the computation resource may have a workload characteristic different from that of the second layer or the third layer assigned to the memory access resource.

The performing of the layer-unit scheduling may include performing the layer-unit scheduling on the first model and the second model based on a workload characteristic of each layer of the first model and the second model and a hardware resource of the accelerator.

The performing of the layer-unit scheduling may include performing the layer-unit scheduling on the first model and the second model to use intermediate data of each of the first model and the second model is reused in an internal memory of the accelerator.

The performing of the layer-unit scheduling may include performing the layer-unit scheduling on the first model and the second model to determine an optimal scheduling result in a current step based on an optimal scheduling result in up to a previous step in searching for a path indicating an execution order from an input layer included in each of the first model and the second model to an output layer included in each of the first model and the second model.

The first model and the second model may have no data dependency on each other when being executed in the accelerator.

A hardware resource of the accelerator may include a computation resource based on at least one processing element included in the accelerator and a memory access resource based on an internal memory and/or external memory of the accelerator.

The workload characteristics may include a memory-intensive characteristic where a memory access cost for processing a corresponding workload is greater than a computation cost, and a compute-intensive characteristic where a computation cost for processing a corresponding workload is greater than a memory access cost.

The method may include selecting, from models for which the execution request is received, at least two models on which the scheduling is to be performed based on a workload characteristic of each of the models and a hardware resource of the accelerator, wherein the performing of the layer-unit scheduling may include performing the layer-unit scheduling on the selected at least two models based on the workload characteristic.

In another general aspect, there is provided a scheduler configured to schedule execution of a model an accelerator, the scheduler including a processor configured to receive at least one execution request for a first model and a second model that are executed independently from each other in the accelerator, and perform layer-unit scheduling on the first model and the second model based on workload characteristics of the first model and the second model.

The processor may be configured to perform the layer-unit scheduling on the first model and the second model, independently from an order in which the at least one execution request is received.

One of the first model and the second model may have a workload characteristic with a computation cost greater than a memory access cost, and the other one of the first model and the second model may have a workload characteristic with a memory access cost greater than a computation cost.

The processor may be configured to perform the layer-unit scheduling such that layers included in the first model and layers included in the second model are processed with a time interval therebetween, in response to the first model and the second model having a same workload characteristic.

In another general aspect, there is provided an accelerator apparatus including a scheduler configured to receive at least one execution request for a first model and a second model that are executed independently from each other, and to perform layer-unit scheduling on the first model and the second model based on workload characteristics of the first model and the second model, and an accelerator configured to execute the first model and the second model based on a schedule determined by the scheduler.

Other features and aspects will be apparent from the following detailed description, the drawings, and the claims.

Figure 1A:
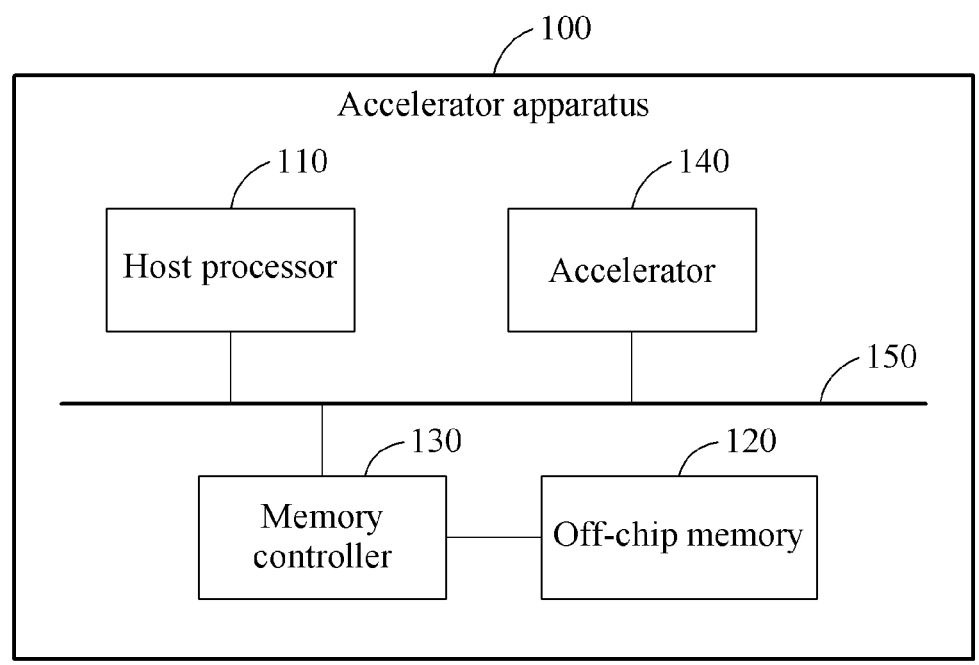
FIGS. 1A and 1B are diagrams illustrating examples of an accelerator apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

Figure 1B:
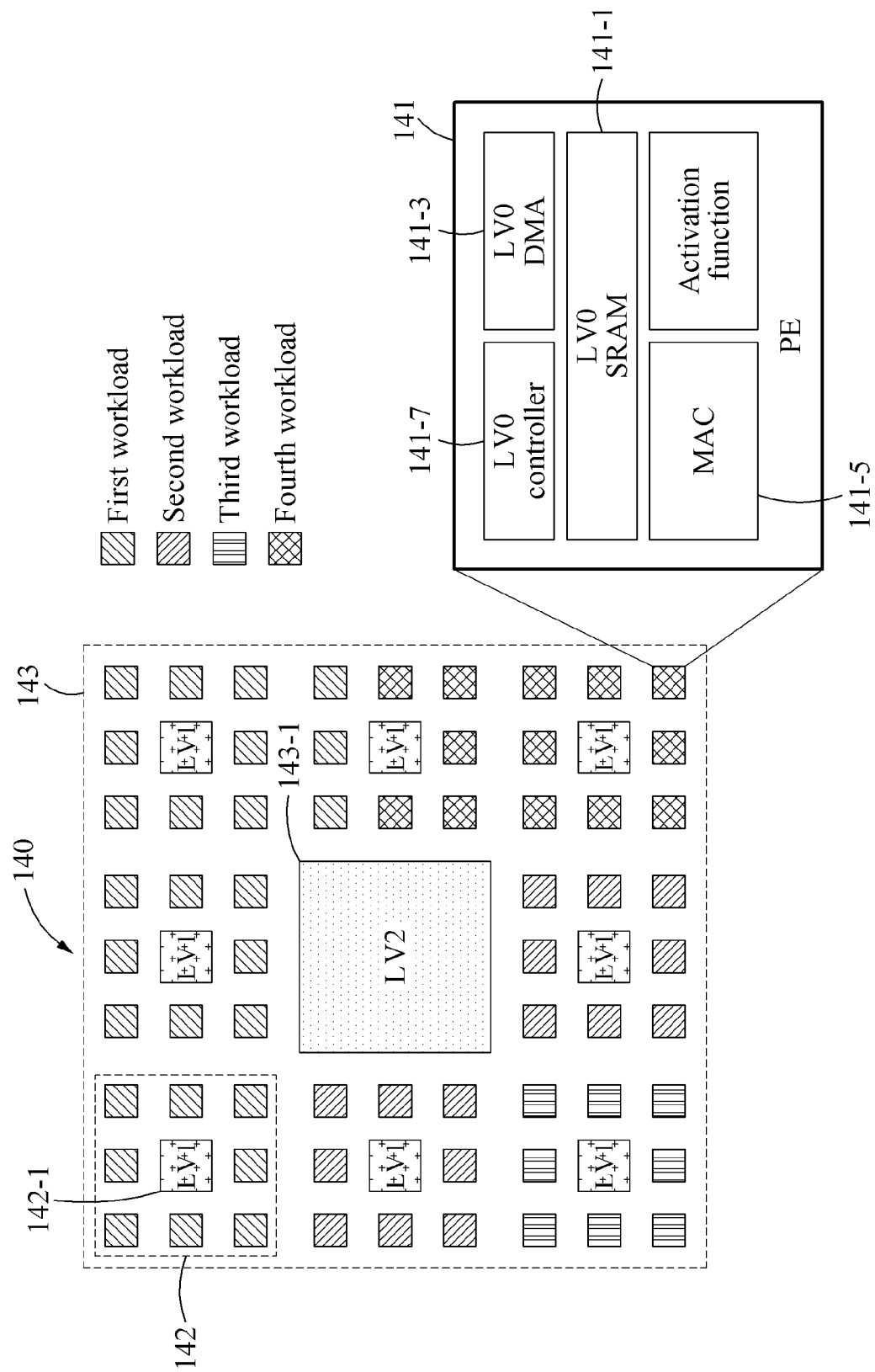

FIGS. 1A and 1B are diagrams illustrating an example of an accelerator apparatus.

Referring to FIG. 1A, an accelerator apparatus 100 includes a host processor 110, an off-chip memory 120, a memory controller 130, and an accelerator 140. The host processor 110, the off-chip memory 120, the memory controller 130, and the accelerator 140 may communicate with one another through a bus 150.

The host processor 110 may be a device configured to control respective operations of components included in the accelerator apparatus 100 and include a central processing unit (CPU), for example. The host processor 110 may receive at least one request for processing a neural network in the accelerator 140, and generate an instruction that is executable in the accelerator 140 in response to the received request. The request may be made for data inference based on the neural network, and for obtaining a result of the data inference by allowing the accelerator 140 to execute the neural network for tasks such as, for example, speech recognition, voice translation, machine translation, machine interpretation, object recognition, pattern recognition, object verification, authentication and computer vision. Target inference data and parameters of the neural network may be transferred to the accelerator 140 by the host processor 110.

The off-chip memory 120 may be a memory disposed outside the accelerator 140. In an example, the off-chip memory 120 may be a dynamic random-access memory (DRAM) used as a main memory of the accelerator apparatus 100. The off-chip memory 120 may be accessible through the memory controller 130. The off-chip memory 120 may store the parameters of the neural network to be executed in the accelerator 140, and be used when an on-chip memory in the accelerator 140 is not sufficient to execute the neural network in the accelerator 140.

The off-chip memory 120 may have a larger memory capacity than the on-chip memory in the accelerator 140. However, when executing the neural network, a cost for access by the accelerator 140 to the off-chip memory 120 may be greater than a cost for access to the on-chip memory. Such a memory access cost may indicate an amount of power and/or time that is used for accessing a memory and then reading or writing data from or in the memory.

The accelerator 140 may be an artificial intelligence (AI) accelerator configured to execute the neural network according to an instruction of the host processor 110 and infer data that is input. In an example, accelerator 140 may be a separate processor distinguished from the host processor 110. The accelerator 140 may be device such as, for example, a neural processing unit (NPU), a graphics processing unit (GPU), and a tensor processing unit (TPU).

The accelerator 140 may process a workload that is more effectively processed by a separate dedicated processor, for example, the accelerator 140, than by the host processor 110 used for general purposes based on characteristics of operations of the neural network. Here, one or more processing elements (PEs) included in the accelerator 140, and the on-chip memory may be used. The on-chip memory may be a device including a global shared buffer and a local buffer that are included in the accelerator 140, and be distinguished from the off-chip memory 120 disposed outside the accelerator 140. The on-chip memory may include memory such as, for example, a scratchpad memory accessible through an address space, and a static random-access memory (SRAM).

The neural network includes a plurality of layers. In an example, the neural network may include an input layer, a plurality of hidden layers, and an output layer. Each of the layers may include a plurality of nodes each referred to as an artificial neuron. Each of the nodes may indicate a computation unit having at least one input and output, and the nodes may be connected to one another. A weight may be set for a connection between nodes, and be adjusted or changed. The weight may increase, decrease, or maintain a related data value, determining an influence of the data value on a final result. To each node included in the output layer, weighted inputs of nodes included in a previous layer may be input. A process in which weighted data is input from a layer to a subsequent layer of the layer may be referred to as propagation.

In an example, when a plurality of requests is received by the host processor 110, the accelerator 140 may execute a plurality of neural networks according to an instruction transmitted from the host processor 110. In this example, the neural networks to be executed in the accelerator 140 may have different structures, or the same neural network may be executed several times. For example, when the neural networks are executed in the accelerator 140 based simply on an order in which the requests are received by the host processor 110, it may not be possible to reduce an idle time during which a hardware resource of the accelerator 140 is not used in the course of the execution due to workload characteristics of the neural networks. In addition, a great tail latency in which a request received late is significantly delayed while a previous request is processed may occur. To prevent such a degradation of a utilization rate of the accelerator 140, scheduling for the neural networks to be executed in the accelerator 140 may be needed. By performing the scheduling on the neural networks for each layer unit, it is possible to minimize the idle time occurring during the execution. A neural network described herein may also be referred to as a model for the convenience of description.

FIG. 1B illustrates an example structure of the accelerator 140 configured to execute a scheduled model. The accelerator 140 may include a plurality of PEs and a multilevel memory accessible by at least one of the PEs. The multilevel memory may be a collective expression of a level (LV) 0 memory 141-1, an LV 1 memory 142-1, and an LV 2 memory 143-1 that correspond to an on-chip memory of the accelerator 140.

A PE 141 among the PEs may include an LV 0 memory 141-1, an LV 0 direct memory access (DMA) 141-3, a multiplier-accumulator (MAC) 141-5, and an LV 0 controller 141-7.

The LV 0 memory 141-1 may be a memory accessible by the corresponding PE 141. That is, the LV 0 memory 141-1 may be accessible only by the PE 141 which is one of the PEs included in the accelerator 140.

The LV0 DMA 141-3 may control input data and/or output data of the LV0 memory 141-1 based on an instruction from the LV0 controller 141-7. The LV0 DMA 141-3 may read data from the LV0 memory 141-1 or write data in the LV0 memory 141-1 based on information associated with a source, a destination, and a data size that are included in the instruction from the LV0 controller 141-7.

In an example, data input to the LV 0 memory 141-1 or data output from LV 0 memory 141-1 may be monitored and/or profiled. Such monitoring and/or profiling may be performed in the LV0 DMA 141-3 or a separate element. Through the monitoring and/or profiling, it is possible to verify an access cost of the LV 0 memory 141-1, usage information of the LV 0 memory 141-1, and a type of data stored in the LV0 memory 141-1. For example, the LV0 DMA 141-3 may verify what percentage is indicated as the usage information of the LV0 memory 141-1, and which workload is involved with the data stored in the LV0 memory 141-1.

The MAC 141-5 may perform an operation or computation involved with a workload assigned to the PE 141. For example, the MAC 141-5 may perform a multiply-accumulate operation on given data. In addition, the MAC 141-5 may apply an activation function to the given data. The activation function may be sigmoid, hyperbolic tangent (tanh), or a rectified linear unit (ReLU), for example.

The LV0 controller 141-7 may be a device configured to control components included in the PE 141. For example, the LV0 controller 141-7 may control the LV0 memory 141-1, the LV0 DMA 141-3, and the MAC 141-5.

The accelerator 140 may include the PEs each performing an operation or computation independently, and the foregoing description of the PE 141 may be applied to each of the PEs included in the accelerator 140.

In an example, each n PEs among the PEs may cluster together. In this example, n is a natural number greater than 1 and less than the number of the PEs included in the accelerator 140. That is, a portion of the PEs included in the accelerator 140 may cluster together to form a cluster, for example, a PE cluster 142.

PEs included in the cluster 142 may share one LV1 memory 142-1. That is, the LV1 memory 142-1 may be accessible by the PEs included in the cluster 142. For example, even though operations respectively performed in a first PE and a second PE among the PEs in the cluster 142 are different from each other, a portion of data required for the operations may be common. As the common data is stored in the LV1 memory 142-1, rather than being stored in an LV0 memory 141-1 included in each of the first PE and the second PE, and thus the first PE and the second PE may share the common data, and an overall system operation efficiency may be improved. In the example of FIG. 1B, each of the PEs may access an LV1 memory 142-1 adjacent to each of the PEs.

Although not illustrated in FIG. 1B, there is an LV1 DMA configured to monitor and/or profile data input to or output from the LV1 memory 142-1. In addition, there is also an LV1 controller to control the LV1 memory 142-1 and the LV1 DMA.

In addition, all the PEs may share the LV2 memory 143-1. That is, the LV2 memory 143-1 may be accessible by all the PEs included in accelerator 140. For example, there may be PEs that share a portion of data required to perform an operation, although not clustering together to form a same cluster, among the PEs included in the accelerator 140. In this example, such PEs may not share the data through the LV1 memory 142-1, but effectively share the common data through the LV2 memory 143-1, thereby increasing the overall operation efficiency. Although not illustrated in FIG. 1B, there is an LV2 DMA configured to monitor and/or profile data input to or output from the LV2 memory 143-1. In addition, there is also an LV2 controller to control the LV2 memory 143-1 and the LV2 DMA.

As described above, each of the PEs may access a respective LV0 memory 141-1, an LV1 memory 142-1 adjacent to each of the PEs, and an LV2 memory 143-1 of the accelerator 140, and use these memories to perform an assigned workload. The accelerator 140 may include a multilevel memory including hierarchical memories. In addition, a DMA and a controller included in the accelerator 140 may be of a hierarchical multilevel type.

In the example of FIG. 1B, the PEs included in the accelerator 140 may simultaneously perform four workloads. For example, a workload with a relatively greater operation amount may be assigned to a greater number of PEs and processed therein, and a workload with a relatively less operation amount may be assigned to a smaller number of PEs and processed therein.

It is illustrated in FIG. 1B that every eight PEs among 64 PEs cluster together to form eight clusters, and three level memories are used to perform the four workloads, for the convenience of description. However, various numbers of PEs, workloads, and levels may be applied without limitation.

Hereinafter, performing scheduling on models will be described in detail with reference to the accompanying drawings.

Figure 2:
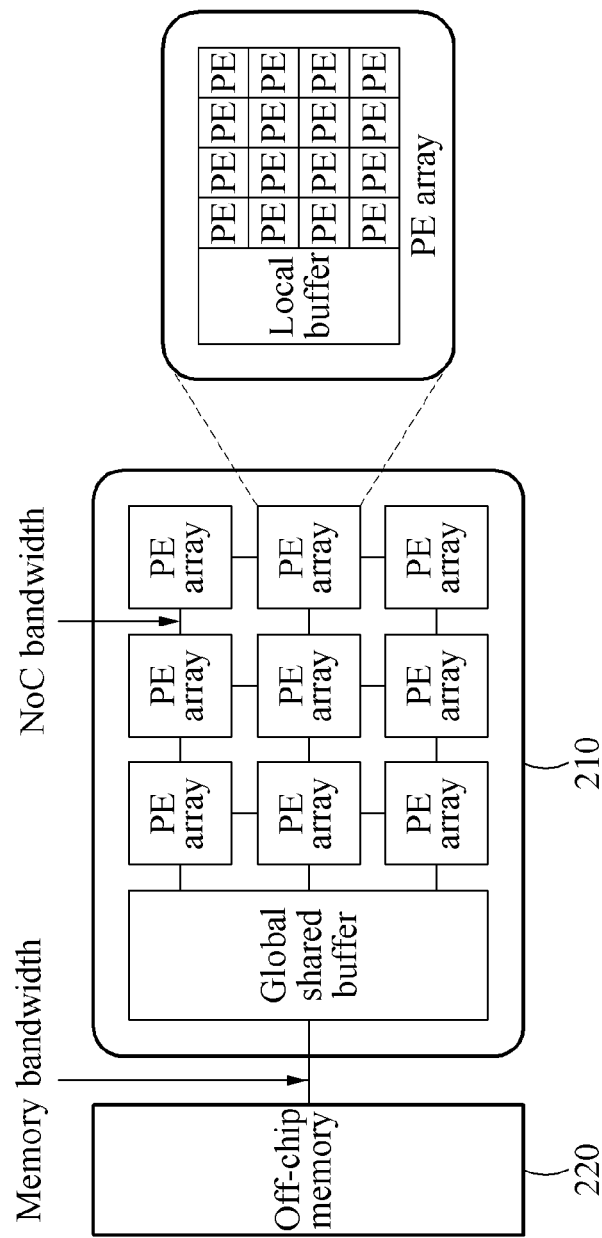
FIG. 2 is a diagram illustrating an example of a hardware resource of an accelerator.

FIG. 2 is a diagram illustrating an example of a hardware resource of an accelerator.

In the example of FIG. 2, illustrated are an accelerator 210 and an off-chip memory 220.

In the example, the accelerator 210 includes a global shared buffer, and a plurality of PE arrays sharing the global shared buffer. Each of the PE arrays includes a local buffer, and a plurality of PEs sharing the local buffer. The global shared buffer and the local buffer may be referred to as an on-chip memory disposed inside the accelerator 210.

To execute a model in the accelerator 210, a process of reading data required to execute the model through a memory access, performing an operation or computation in at least one PE, and storing a result of the computation in a memory may be performed. The memory described herein may also include the off-chip memory 220 in addition to the on-chip memory.

The on-chip memory may refer to a memory disposed inside the accelerator 210, and have a lower access cost than the off-chip memory 220. However, the on-chip memory may have a smaller memory capacity than the off-chip memory 220, and thus the on-chip memory may not be sufficient to store all data for processing operations in PEs. Thus, the off-chip memory 220 may be used in such a case.

To execute a model in the accelerator 210, various hardware resources may be used. For example, a computation resource based on at least one PE and a memory access resource based on the on-chip memory and/or the off-chip memory 220 may be used.

For example, the computation resource may indicate a computation or operation quantity that is processible in a PE, and be represented by a unit, such as, for example, floating point operations per second (FLOPS) and tera operations per second (TOPS). The memory access resource may indicate a network-on-chip (NoC) bandwidth between PE arrays and a memory bandwidth between the accelerator 210 and the off-chip memory 220, and be represented by a unit, such as, for example, gigabytes per second (GB/s). In addition, the memory access resource may indicate a memory capacity of the global shared buffer and the local buffer, and be represented by a unit, such as, for example, megabyte (MB).

Models and/or layers included in each of the models may have different workload characteristics, and thus the computation resource and the memory access resource that are required for each model or layer may differ for each model or layer. Thus, by performing scheduling such that times for which resources in the accelerator 210 are used maximally overlap based on workload characteristics of the models and/or the layers included in each of the models, it is possible to improve an overall system performance.

In an example, for the model scheduling, data dependency and the availability of the on-chip memory may be considered.

The data dependency may indicate a computation order of data intended by a programmer or a compiler to obtain a desired result, and a plurality of layers included in a model may be sequentially processed in a preset order. However, there is no data dependency among a plurality of models to be processed in the accelerator 210, and thus a change in a processing order of the models may not have a significant effect. For example, after one layer included in a first model is processed, a subsequent layer of the first model may be processed or a layer of a second model to be subsequently processed may be processed. As described in the foregoing, a processing order between the first model and the second model may change by each layer unit.

The availability of the on-chip memory may restrict the processing of the accelerator 210. The on-chip memory may be an internal memory of the accelerator 210 that is fast accessible, but may not have a memory capacity sufficient to perform computation in PEs. In such a case, when using the off-chip memory 220 corresponding to an external memory of the accelerator 210, a memory access time may be considered for performing scheduling because it is greater than that of the on-chip memory. That is, a method of reusing intermediate data of each model in the on-chip memory of the accelerator 210 may also affect the memory access cost, and thus it may also be considered for the scheduling.

Figure 3:
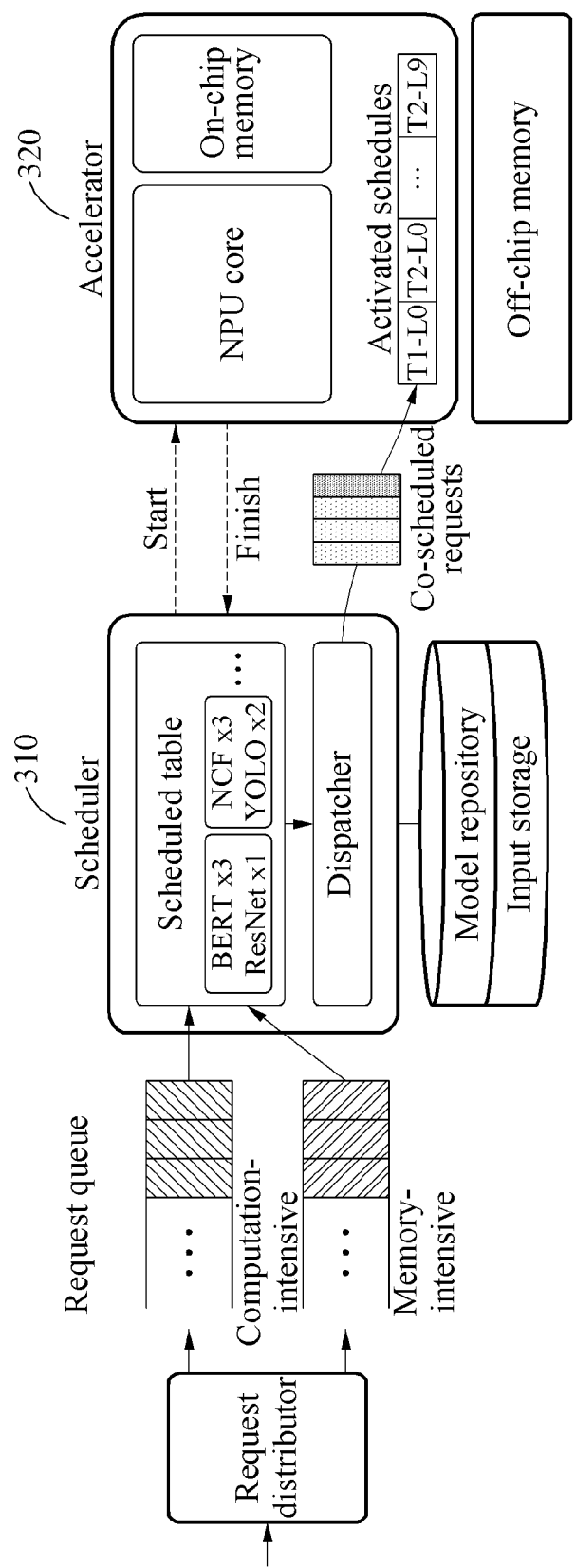
FIG. 3 is a diagram illustrating an example of a scheduler and an accelerator.

FIG. 3 is a diagram illustrating an example of a scheduler and an accelerator.

Referring to FIG. 3, a scheduler 310 is configured to perform scheduling on models to be executed in an accelerator 320. For example, the scheduler 310 may be embodied as the host processor 110 of FIG. 1A, or may be implemented on a separate device.

Requests transferred from a plurality of users or a single user may be distributed by a request distributor based on workload characteristics. For example, the request distributor may distribute each of the requests to any one of a memory-intensive characteristic with a memory access cost greater than a computation cost and a compute-intensive characteristic with a computation cost greater than a memory access cost. Such distributed requests may be stored in a request queue. That is, user requests transferred to an accelerator apparatus may be analyzed based on their characteristics and then stored in different queues.

The scheduler 310 may perform layer-unit scheduling on a plurality of models for which requests are made based on workload characteristics. Here, the scheduler 310 may perform the layer-unit scheduling on the models, independently from an order in which the requests are received because there is no data dependency between the models.

In an example, the scheduler 310 may perform the scheduling on models having different workload characteristics. The scheduler 310 may perform the scheduling on a model having a compute-intensive characteristic and a model with a memory-intensive characteristic. For example, the model having the compute-intensive characteristic may include a convolutional neural network (CNN) and the like. The model having the memory-intensive characteristic may include, for example, a multilayer perceptron, bidirectional encoder representations from transformers (BERT), a recommendation model, and the like. By performing the scheduling on a model with a greater computation cost and a model with a greater memory access cost, it is possible to effectively prevent an idle time from occurring in a hardware resource of the accelerator 320 and improve an overall system throughput.

In addition, the scheduler 310 may also perform the scheduling on models having the same characteristic. For example, when the models having the same characteristic, also referred to herein as same models, are executed in the accelerator 320, the scheduling may be performed such that layers included in each of the models are processed with a predetermined time difference or interval between the layers. For example, there may be a layer having the compute-intensive characteristic and a layer having the memory-intensive characteristic among a plurality of layers included in a model. Thus, using a difference between an computation cost and a memory access cost based on a workload characteristic of each layer of the model, it is possible to improve a utilization rate of the accelerator 320 even when the models having the same characteristic are executed together.

In an example, the scheduler 310 may select at least two models on which the scheduling is to be performed from the models for which the execution requests are received, based on a workload characteristic of each of the models and the hardware resource of the accelerator 320. For example, the scheduler 310 may perform the scheduling by selecting models having different workload characteristics from the models, or by selecting models having the same characteristic from the models.

A schedule determined by the scheduler 310 may be recorded in the form of a table, and a dispatcher may control, through an accelerator driver, the hardware resource of the accelerator 320 to process a memory access and a computation corresponding to each layer at a timing. In another example, the schedule determined by the scheduler 310 may be transferred to the accelerator 320, and be performed directly in the accelerator 320.

The accelerator 320 may execute the models according to the schedule determined by the scheduler 310. Here, model parameters stored in a model repository and input data stored in an input storage may be transferred to the accelerator 320.

Figure 4:
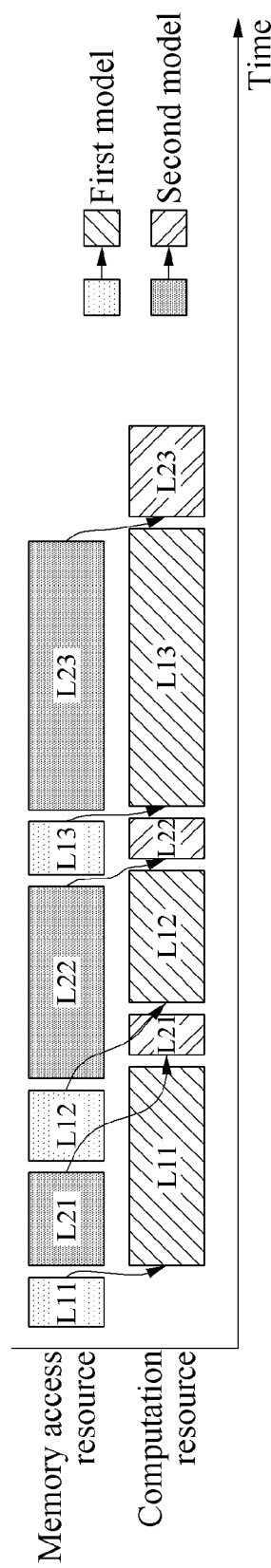
FIG. 4 is a diagram illustrating an example of an operation of a scheduler.

FIG. 4 is a diagram illustrating an example of an operation of a scheduler.

FIG. 4 illustrates an example where models having different workload characteristics are scheduled. In the example of FIG. 4, it is assumed that a first model has a workload characteristic with a computation cost greater than a memory access cost, and a second model has a workload characteristic with a memory access cost greater than a computation cost.

For computation to be performed in a computation resource, data which is a target for the computation may need to be first read through a memory access resource. In addition, the memory access resource and the computation resource may operate in parallel, and thus data for a next computation may be read in advance by the memory access resource while the computation is being performed in the computation resource. When there is no or minimum idle time between the memory access resource and the computation resource, a utilization rate of an accelerator apparatus may be improved, and a higher level of performance may be expected.

For example, as illustrated in FIG. 4, a layer L11 which is a first layer of the first model with the less memory access cost may be assigned to the memory access resource, and then a memory access operation based on the layer L11 may be performed. When the memory access operation is terminated, the layer L11 may be assigned to the computation resource and then a computation operation based on the layer L11 may be performed. In addition, a layer L21 which is a first layer of the second model may be assigned to the memory access resource, and a memory access operation based on the layer L21 may be performed. When the memory access operation of the layer L21 is terminated while the computation operation of the layer L11 is being performed, a layer L12 which is a second layer of the first model may be subsequently assigned to the memory access resource. Thus, it is possible to prevent an idle time from occurring in the memory access resource. The scheduling based on a layer unit may be performed in such a way up to a last layer of each of the first model and the second model.

A degree of use of each resource is different for each layer as described above, and thus two layers having different workload characteristics among layers included in each of the first model and the second model may be assigned respectively to the computation resource and the memory access resource of the accelerator. For example, while a layer included in the first model is being assigned to the computation resource of the accelerator, the scheduler may assign, to the memory access resource of the accelerator, a subsequent layer of the first model or a layer of the second model to be subsequently processed. In this example, the layer of the first model to be assigned to the computation resource may have a different workload characteristic from that of the subsequent layer of the first model and the layer of the second model to be assigned to the memory access resource.

As described above, by performing layer-unit scheduling on the first model and the second model based on a workload characteristic of each layer of the first model and the second model and the hardware resource of the accelerator, it is possible to prevent an idle time from occurring in each resource and improve the utilization rate. The scheduler may perform the scheduling to change an execution order based on a layer level between independent models or on a corresponding computation unit, for example, a residual block, an inception module, and the like.

Figure 5:
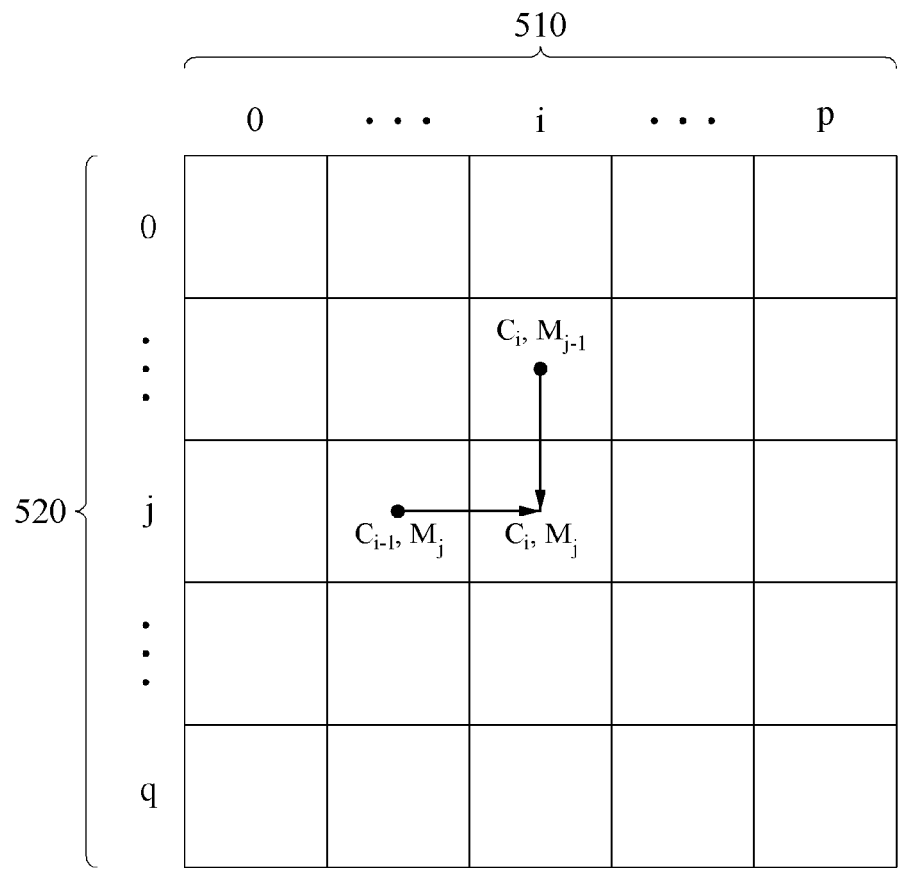
FIG. 5 is a diagram illustrating an example of a layer-unit scheduling search.

FIG. 5 is a diagram illustrating an example of a layer-unit scheduling search.

FIG. 5 illustrates an example of a layer-unit scheduling search between a compute-intensive model 510 and a memory-intensive model 520. In the example of FIG. 5, it is assumed for the convenience of description that the compute-intensive model 510 includes p layers and the memory-intensive model 520 includes q layers.

In an example, a scheduler may perform dynamic programming-based layer-unit scheduling for an optimal scheduling search. In a process of searching for a path indicating an execution order from an input layer (or a first layer) included in each model up to an output layer (or a last layer) included in each model, the scheduler may gradually determine an optimal scheduling result in a current step based on an optimal scheduling result obtained up to a previous step.

In the example of FIG. 5, a path from <0, 0> at an upper left end to <p, q> at a lower right end may indicate an execution order of layers included in each model. As described above, an optimal scheduling result in a current step <j, j> may be gradually determined based on an optimal scheduling result obtained up to previous steps <i-1, j> and <i, j-1>. $C_i$ may indicate a computation cost for an i-th layer of the compute-intensive model 510, and $M_j$ may indicate a memory access cost for a j-th layer of the memory-intensive model 520. Here, each cost may be represented as the number of cycles. As the number of cycles decreases, an operation speed may increase.

For scheduling, and computing or calculating a cost in the current step <i, j>, a data dependency between a usage amount of an on-chip memory of an accelerator and a layer may need to be considered. Based on a layer structure, a parameter of a neural network stored in the on-chip memory or output data may be reused in a subsequent layer or may move to an off-chip memory. Here, each operation may accompany a cost, for example, the number of cycles, energy, and the like, and thus an operation speed may be determined differently by a total cost required for each path. Through such a method, the on-chip memory may be managed by a compiler, a runtime hardware, or a separate hardware structure, or the scheduler may consider this and be embodied to search for a more desirable schedule.

For example, using an optimal scheduling result obtained up to the previous step <i-1, j> and a result of a simulation performed by adding a layer in a direction from the previous step <i-1, j> to the current step <i, j>, the path may be updated and the number of cycles at such a time may be determined. In addition, using an optimal scheduling result obtained up to the previous step <i, j-1> and a result of a simulation performed by adding a layer in a direction from the previous step <i, j-1> to the current step <i, j>, the path may be updated and the number of cycles at such a time may be determined. In the current step <i, j>, two schedules and the numbers of cycles derived from the previous steps may all be recorded, and these may be used in a subsequent search step. In the last step <p, q>, the path with the least number of cycles may be selected from the paths updated in such a manner described above.

As described above, by reusing the optimal scheduling results that are searched for up to the steps <i-1, j> and <i, j-1> to determine the optimal scheduling result in the current step <i, j>, it is possible to minimize a search cost. Through such a method, by determining, to be optimal scheduling, a path that connects from <0, 0> to <p, q> by the minimum number of cycles, it is possible to determine a layer execution order of high quality within a finite time.

Figure 6:
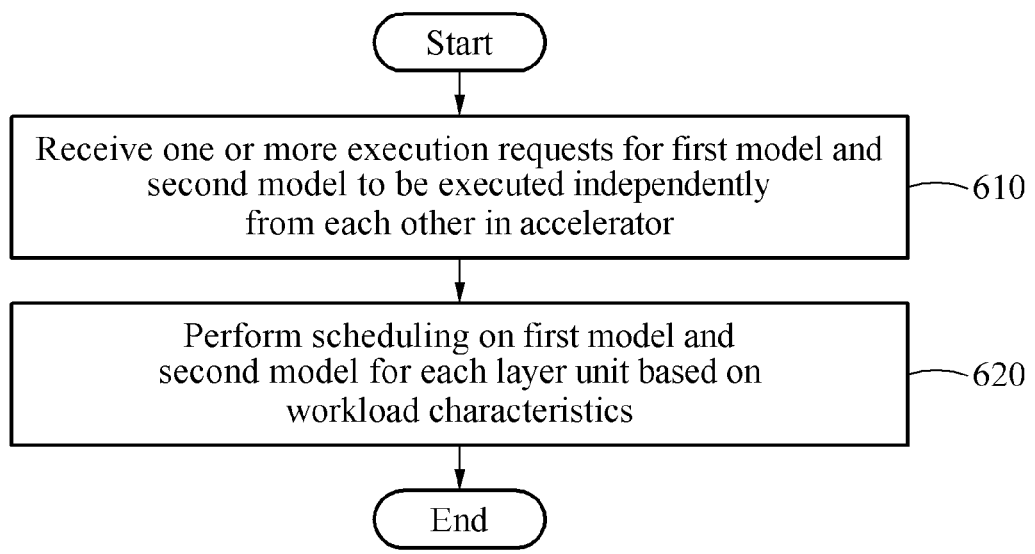
FIG. 6 is a diagram illustrating an example of a method of operating a scheduler.

FIG. 6 is a diagram illustrating an example of a method of operating a scheduler. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

FIG. 6 illustrates a method of operating a scheduler.

Referring to FIG. 6, in operation 610, the scheduler receives at least one execution request for a first model and a second model that are executed independently from each other in an accelerator. In operation 620, the scheduler performs layer-unit scheduling on the first model and the second model based on workload characteristics of the first model and the second model.

The scheduler may be comprehensively applied to a product line to which a plurality of systems-on-chips (SoCs) each including a plurality of PEs and a shared memory is applied to accelerate AI processing. In addition, when the accelerator processes a wide range of workloads, the scheduler may be applied to appropriately assign the workloads to the hardware resource.

In addition, the scheduler may classify deep learning model workloads into a compute-intensive characteristic and a memory-intensive characteristic for each model or each layer, and dynamically assign the workloads to a resource based on a situation of the hardware resource of the accelerator. Thus, it is possible to maximize a utilization rate of the accelerator. Further, through a structure in which access and computation are decoupled, the scheduler may hide a memory access time and improve the efficiency of a computation resource.

Figure 7:
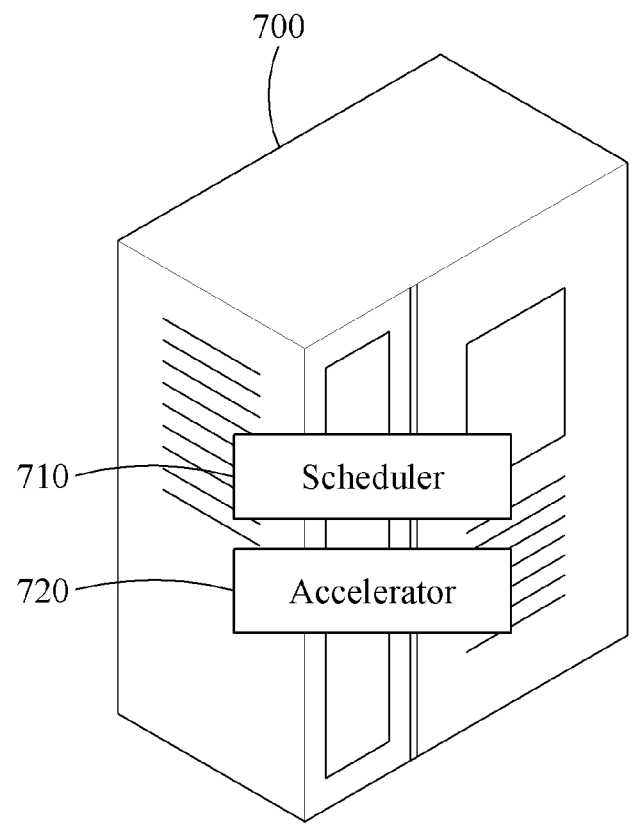
FIGS. 7 and 8 are diagrams illustrating examples of accelerator apparatuses.
Figure 8:
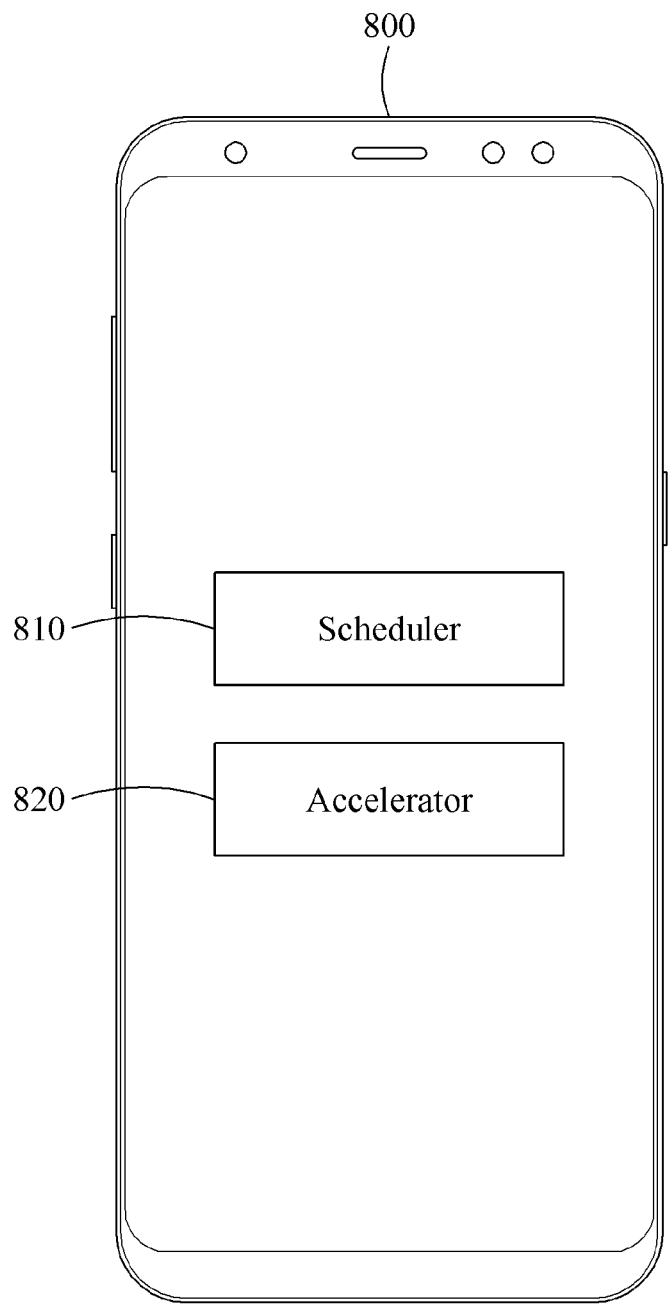

FIGS. 7 and 8 are diagrams illustrating examples of an accelerator apparatus.

Referring to FIG. 7, an accelerator apparatus may be embodied as a server 700.

The server 700 may refer to a separate device distinguished from a user terminal that is controlled by a user, and may communicate with one or more user terminals through a wired and/or wireless network. The server 700 may receive requests that are simultaneously transmitted from multiple users through their user terminals. Through a scheduler 710, the server 700 may perform scheduling on a plurality of models to be executed in an accelerator 720. The accelerator

720 may execute the models based on a schedule and determine inference results. The server 700 may then return the inference results to respective corresponding user terminals. A user terminal described herein may include, for example, a computing device such as a smartphone, a personal computer (PC), a tablet PC, a desk top, a personal digital assistant (PDA), a set-top box, and a laptop, a wearable device such as a smart watch and smart eyeglasses, a home appliance such as a smart speaker, a smart TV, and a smart refrigerator, and other devices such as a smart vehicle, an intelligent vehicle, a gaming device, a smart kiosk, a smart home system, and an Internet of things (IoT) device.

Referring to FIG. 8, an accelerator apparatus may be embodied as a user terminal 800 including a scheduler 810 and an accelerator 820. Although the user terminal 800 is illustrated as a smartphone in FIG. 8 for the convenience of description, any device that is controlled by a user may be applicable without limitation. The user terminal 800 may obtain requests directly from a user, and perform scheduling on models to be executed in the accelerator 820 through the scheduler 810. The accelerator 820 may execute the models based on a schedule and determine results such as, for example, inference, translation, and recognition.

The scheduler, the accelerator, the accelerator apparatus 100, accelerator 140, scheduler 310, accelerator 320, scheduler 710, accelerator 720, scheduler 810, and accelerator 820, and other apparatuses, units, modules, devices, and other components described herein with respect to FIGS. 1A-1B, 2-4, and 7-8 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of scheduling an accelerator. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD–Rs, CD+Rs, CD–RWs, CD+RWs, DVD-ROMs, DVD–Rs, DVD+Rs, DVD–RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of scheduling an accelerator, the method comprising:
    receiving at least one execution request for a first model and a second model that are executed independently from each other in the accelerator; and
    performing layer-unit scheduling on the first model and the second model based on workload characteristics of the first model and the second model, such that layers of the first model and layers of the second model are alternately executed by the accelerator,
        receiving at least one execution request for a first model and a second model that are executed independently from each other in the accelerator; and
        determining an optimal scheduling result to find a path indicating an execution order from an input layer included in each of the first model and the second model to an output layer included in each of the first model and the second model, the determining being based on. for a current step. employing a current simulation of adding a layer of the input layer in a direction from a previous simulation from a previous step to the current step.

2. The method of claim 1, wherein the performing of the layer-unit scheduling comprises:
    performing the layer-unit scheduling on the first model and the second model, independently from an order in which the at least one execution request is received.

3. The method of claim 1, wherein the respective workload characteristics include first workloads with a computation cost greater than a memory access cost and second workload characteristics with a memory access cost greater than a computation cost.

4. The method of claim 1, wherein the performing of the layer-unit scheduling comprises:
    performing the layer-unit scheduling such that the layers of the first model and the layers of the second model are processed with a time interval therebetween, in response to the first model and the second model having a same workload characteristic.

5. The method of claim 1, wherein the performing of the layer-unit scheduling comprises:
    assigning two layers having different workload characteristics among layers in each of the first model and the second model to the computation resource and the memory access resource of the accelerator, respectively.

6. The method of claim 1, wherein the performing of the layer-unit scheduling comprises:
    assigning, to the memory access resource of the accelerator, a second layer subsequent to a first layer in the first model or a third layer to be subsequently processed in the second model, in response to the first layer of the first model being assigned to the computation resource of the accelerator.

7. The method of claim 6, wherein the first layer assigned to the computation resource has a workload characteristic different from that of the second layer or the third layer assigned to the memory access resource.

8. The method of claim 1, wherein the performing of the layer-unit scheduling comprises:
    performing the layer-unit scheduling on the first model and the second model based on a workload characteristic of each layer of the first model and the second model and a hardware resource of the accelerator.

9. The method of claim 1, wherein the performing of the layer-unit scheduling comprises:
    performing the layer-unit scheduling on the first model and the second model to use intermediate data of each of the first model and the second model is reused in an internal memory of the accelerator.

10. The method of claim 1, wherein the first model and the second model have no data dependency on each other when being executed in the accelerator.

11. The method of claim 1, wherein a hardware resource of the accelerator comprises the computation resource based on at least one processing element included in the accelerator and the memory access resource based on an internal memory and/or external memory of the accelerator.

12. The method of claim 1, wherein the workload characteristics comprises a memory-intensive characteristic where a memory access cost for processing a corresponding workload is greater than a computation cost, and a compute-intensive characteristic where a computation cost for processing a corresponding workload is greater than a memory access cost.

13. The method of claim 1, further comprising:
    selecting, from models for which the execution request is received, at least two models on which the scheduling is to be performed based on a workload characteristic of each of the models and a hardware resource of the accelerator,
    wherein the performing of the layer-unit scheduling comprises:

performing the layer-unit scheduling on the selected at least two models based on the workload characteristic.

14. The method of claim 1, wherein the assigning further comprises:
reassigning the respective layers to an other one of the memory access resource or the computation resource upon a completion of an assigned task for the respective layers.

15. The method of claim 1, wherein the assigning further comprises:
assigning a first layer, of one of the first model or the second model, to the memory access resource based on a first workload characteristic of the first layer; and
assigning a second layer, of the one of the first model or the second model, to the computation resource based on a second workload characteristic of the second layer that is different from the first workload characteristic.

16. A scheduler configured to schedule execution of a model in an accelerator, the scheduler comprising:
a processor configured to:
receive at least one execution request for a first model and a second model that are executed independently from each other in the accelerator; and
perform layer-unit scheduling on the first model and the second model based on workload characteristics of the first model and the second model, such that layers of the first model and layers of the second model are alternately executed by the accelerator,
wherein the processor is configured to:
assign either one or both of a layer of the first model and a layer of the second model to be executed by a memory access resource of the accelerator while another layer of the first model is executed by a computation resource of the accelerator; and
determining an optimal scheduling result to find a path indicating an execution order from an input layer included in each of the first model and the second model to an output layer included in each of the first model and the second model, the determining being based on, for a current step, employing a current simulation of adding a layer of the Input layer in a direction from a previous simulation from a previous step to the current step.

17. The scheduler of claim 16, wherein the processor is further configured to:
perform the layer-unit scheduling on the first model and the second model, independently from an order in which the at least one execution request is received.

18. The scheduler of claim 16, wherein one of the first model and the second model has a workload characteristic with a computation cost greater than a memory access cost, and the other one of the first model and the second model has a workload characteristic with a memory access cost greater than a computation cost.

19. The scheduler of claim 16, wherein the processor is further configured to:
perform the layer-unit scheduling such that the layers of the first model and the layers of the second model are processed with a time interval therebetween, in response to the first model and the second model having a same workload characteristic.

20. An accelerator apparatus, comprising:
a processor configured to receive at least one execution request for a first model and a second model that are executed independently from each other, and to perform layer-unit scheduling on the first model and the second model based on workload characteristics of the first model and the second model, such that layers of the first model and layers of the second model are alternately executed by the accelerator; and
an accelerator, comprising another processor, configured to execute the first model and the second model based on a schedule determined by the scheduler,
wherein the scheduler is configured to:
assign either one or both of a layer of the first model and a layer of the second model to be executed by a memory access resource of the accelerator while another layer of the first model is executed by a computation resource of the accelerator; and
determining an optimal scheduling result to find a path indicating an execution order from an input layer included in each of the first model and the second model to an output layer included in each of the first model and the second model, the determining being based on, for a current step. employing a current simulation of adding a layer of the input layer in a direction from a previous simulation from a previous step to the current step.

* * * * *